(12) United States Patent
Shih

(10) Patent No.: US 6,937,382 B2
(45) Date of Patent: Aug. 30, 2005

(54) ACTIVE BORDER PIXELS FOR DIGITAL MICROMIRROR DEVICE

(75) Inventor: Wei-Yan Shih, Plano, TX (US)

(73) Assignee: Texas Instruments Incorporated, Dallas, TX (US)

( * ) Notice: Subject to any disclaimer, the term of this patent is extended or adjusted under 35 U.S.C. 154(b) by 15 days.

(21) Appl. No.: 10/750,146

(22) Filed: Dec. 31, 2003

(65) Prior Publication Data

US 2005/0146771 A1    Jul. 7, 2005

(51) Int. Cl.⁷ .............................................. G02B 26/00
(52) U.S. Cl. ...................... 359/291; 359/290
(58) Field of Search ............................. 359/291, 290, 359/223, 224, 225, 226

(56) References Cited

U.S. PATENT DOCUMENTS

| | | | |
|---|---|---|---|
| 5,706,123 A | 1/1998 | Miller et al. | |
| 5,867,202 A | 2/1999 | Knipe et al. | |
| 6,028,690 A * | 2/2000 | Carter et al. | ................ 359/224 |
| 6,480,177 B2 | 11/2002 | Doherty et al. | |

* cited by examiner

*Primary Examiner*—Scott J. Sugarman
*Assistant Examiner*—Richard Hanig
(74) *Attorney, Agent, or Firm*—Charles A. Brill; Wade James Brady, III; Frederick J. Telecky, Jr.

(57) ABSTRACT

A method of ensuring that border pixels of a micromirror device are set to the "off" position. The method is typically performed at the factory, during inspection of the micromirror device. The border pixels are electrostatically set to the "on" position, then switched so that they are set to the "off" position. A reset signal then results in their being in the "off" position, even those pixels that were previously stuck or torqued "on".

24 Claims, 5 Drawing Sheets

INITIAL MIRROR STATES

| | STUCK+ | TORQUED+ | FLAT | TORQUED- | STUCK- |
|---|---|---|---|---|---|
| LAND + | + | + | + | - | - |
| SWITCH BIAS | + | + | + | - | - |
| APPLY RESET | - | - | - | - | - |
| SUBS RESETS | - | - | - | - | - |

INITIAL MIRROR STATES
|  | STUCK+ | TORQUED+ | FLAT | TORQUED− | STUCK− |
|---|---|---|---|---|---|
| LAND + | + | + | + | − | − |
| SWITCH BIAS | + | + | + | − | − |
| APPLY RESET | − | − | − | − | − |
| SUBS RESETS | − | − | − | − | − |
*FIG. 6*
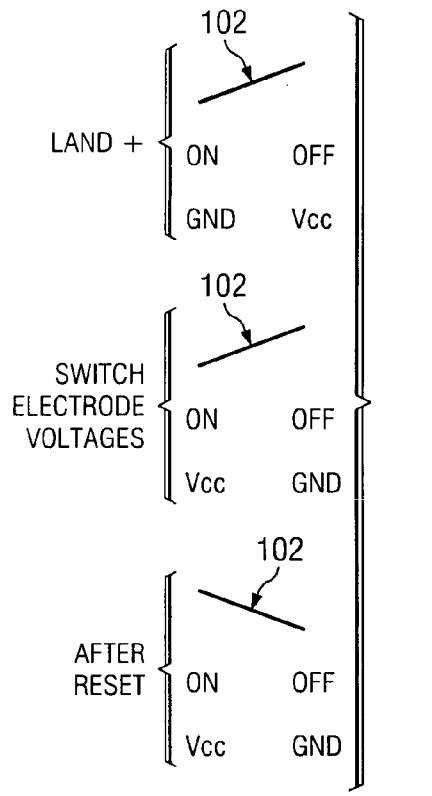
*FIG. 7*
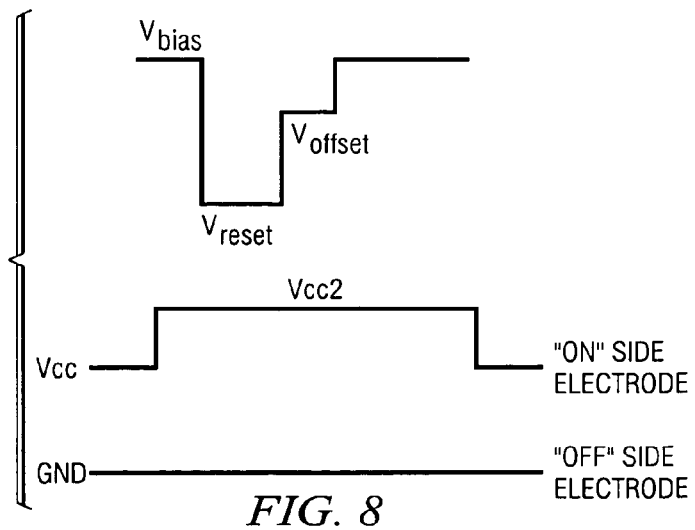
*FIG. 8*

ACTIVE BORDER PIXELS FOR DIGITAL MICROMIRROR DEVICE

TECHNICAL FIELD

This invention relates to digital micromirror devices, and more particularly to controlling the mirrors of the border pixels of the pixel arrays of such devices.

BACKGROUND

A Digital Micromirror Device™ (DMD™) is a type of microelectromechanical systems (MEMS) device. Invented in the 1980's at Texas Instruments Incorporated, the DMD is a fast, reflective digital light switch. Essentially, the DMD is an array of tiny tilting mirrors, each of which is individually addressable to an "on" (bright) or "off" (dark) state.

The DMD has a variety of applications, such as imaging systems and optical switching. For imaging systems, the DMD is combined with image processing, memory, a light source, and optics to form a digital light processing system capable of projecting large, bright, high-contrast color images.

DMD pixel's may have a variety of designs. One design has a mirror that is rigidly connected to an underlying yoke. The yoke in turn is connected by two thin, mechanically compliant torsion hinges to support posts that are attached to the underlying substrate. Electrostatic fields developed between the underlying memory cell and the yoke and mirror cause rotation in the positive or negative (on or off) rotation direction. Another design is "yokeless" and has an underlying hinge and spring tips on the same layer, and operates in response to electrostatic fields between the memory cell and the mirror.

For display applications, the DMD has an active pixel array and a perimeter of border pixels. The pixels of the active array are used to generate images by being tilted to either an "on" (bright) state or "off" (dark) state. The border pixels are always "off" so that they form a dark border around the active array.

The conventional approach to ensuring that the border pixels are always off is to hard wire the address electrodes under the mirror. When appropriate voltages are applied, the resulting electrostatic forces cause their mirrors to tilt in the off direction.

SUMMARY OF THE DISCLOSURE

One aspect of the invention is a method for setting a mirror of border pixels of a digital micromirror device to a desired "on" or "off" position. Typically, border pixels are desired to be in the "off" dark position. A first step is applying appropriate voltages at the address electrodes and mirror of each pixel, such that the pixels are electrostatically set to tilt toward a first (on) position. Next, the electrode voltages are switched. Then, a reset signal is applied to the pixels, which causes them to be positioned to the second (off) position.

A basis of the invention is that border pixels are active rather than hard wired. One technical advantage of the above-described method is that even mirrors that are stuck in the "on" position may be reset to the "off" position. The method is typically performed at the manufacturing plant, as part of device testing and quality control, to correct manufacturing defects and thereby increase yields of acceptable DMD devices.

BRIEF DESCRIPTION OF THE DRAWINGS

For a more complete understanding of the present invention and its features and advantages, reference is now made to the following description, taken in conjunction with the accompanying drawings, in which:

FIG. 6 illustrates various states of DMD mirrors prior to correction in accordance with the invention, as well as the corrective steps for implementation of the invention.

FIG. 7 illustrates the process of positioning a "flat" border pixel to the "off" state.

FIG. 8 illustates the voltages applied to the mirrors and electrodes during a mirror reset.

DETAILED DESCRIPTION

The invention described herein is directed to designing and controlling the border pixels of a DMD. As explained below, these border pixels are designed as "active pixels" so that they may be electrostatically controlled. Standard DMD operating voltages may be used to accomplish the desired "always off" (dark) mirror orientation. The border pixels are provided with spring tips on their "on" (bright) side, so that they are encouraged to tilt to the "off" (dark) side upon application of a reset signal.

Although this description is in terms of setting border pixels to a desired "off" position, the same concepts could be applied to any pixel, not just border pixels. These concepts could further be applied to any pixel that is desired to be "always on", as opposed to "always off".

Overview of DMD Pixel Array Architecture

Figure 1:
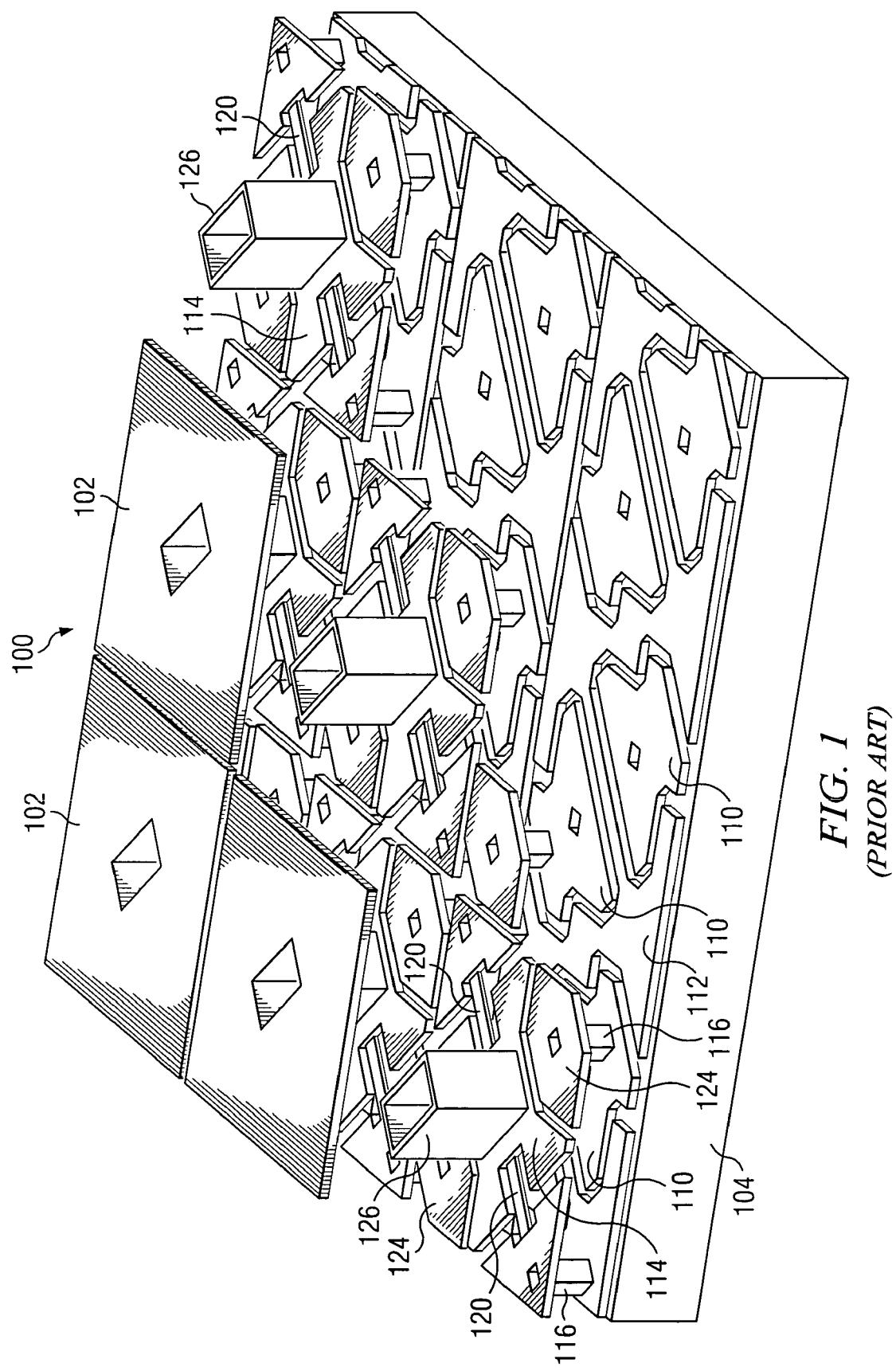
FIG. 1 is a top perspective view of a portion of one embodiment of a mirror array of a digital micromirror device.

FIG. 1 is a top perspective view of a portion (nine pixels 100) of the active array of a DMD. An actual DMD 100 typically has hundreds or thousands of rows and columns of such pixels. The pixels 100 are a "yoke" type design, but the same concepts may be applied to "yokeless" or other DMD pixel designs.

As explained in the Background, the active array has pixel mirrors 102 that are operable to change their direction of tilt to an on or off state. As an example, a mirror may be tilted to a negative side to appear dark, and may be tilted to a positive side to appear light. In other embodiments, the biasing may be of opposite polarization, such that the dark (off) state is a positive state. These two modes of operation are considered equivalent for purposes of the invention described herein.

In FIG. 1, three of the nine pixels have their mirrors 102 removed to show the underlying structure. Another three pixels have had all of the structure removed except for an addressing layer.

Figure 2:
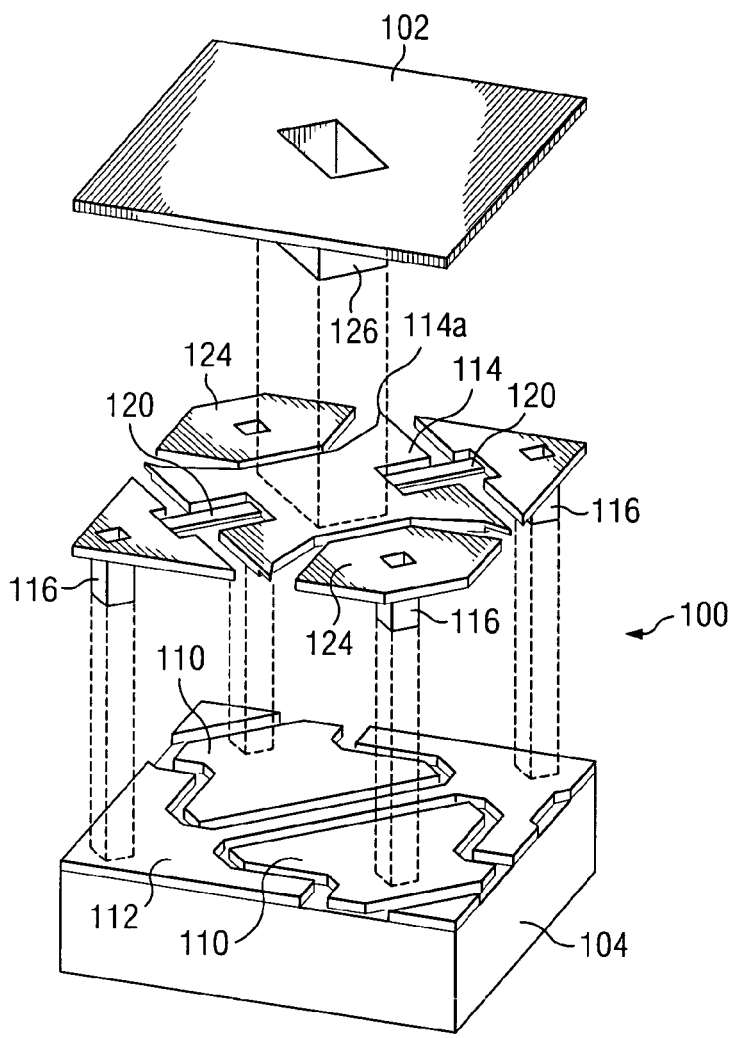
FIG. 2 is an exploded view of one pixel of the array of FIG. 1.

FIG. 2 is an exploded view of a DMD pixel 100. It illustrates how the various layers interrelate, including the underlying static random access memory (SRAM) cell 104, which is used to address the pixel.

Referring to both FIGS. 1 and 2, each pixel 100 is a monolithically integrated MEMS superstructure cell fabricated over the SRAM cell 104. Two sacrificial layers have been removed by plasma etching to produce air gaps between three metal layers of the superstructure. For purposes of this description, the three metal layers are "spaced" apart by being separated by these air gaps. The air gaps free certain parts of the structure to rotate about compliant torsion hinges 120.

The uppermost metal layer has a reflective mirror 102. The mirror 102 is connected, by means of support post 126, to an underlying yoke 114, which in turn is suspended by two thin torsion hinges 120 to support posts 116. When electrostatically activated, the mirror 102 and yoke 114 rotate until the spring tips 114a of yoke 114 come to rest against a landing surface that limits the mirror rotation angle, such as to +10 or −10 degrees.

FIG. 2 is merely representative of the spring tips 114a and other features of the pixel structure, which may have different proportions in actual implementation. A good description of spring tips 114a and their manufacture, for the yoke type design of FIG. 2 is in U.S. Pat. No. 5,867,202, entitled "Micromechanical Devices with Spring Tips" to R. Knipe, et al., assigned to Texas Instruments Incorporated, and incorporated herein by reference.

Address electrodes 110 and 124 are electrically connected to the underlying SRAM cell 104. The yoke 114 and mirror 102 are electrically connected to a bias/reset bus 112, which interconnects the mirrors 102 of many pixels 100 to a bond pad at the chip perimeter.

As an example of the miniscule size of a typical DMD 100, the DMD mirrors 102 are each 16 um square and made of aluminum for maximum reflectivity. They are arrayed on 17 um centers to form a dense pixel array.

In operation, electrostatic fields are developed between the mirror 102 and yoke 114 and their underlying address electrodes 110, creating an efficient electrostatic torque. This torque works against the restoring torque of the hinge 120 to produce mirror rotation in the positive or negative direction.

When the mirror 102 tilts, it is latched into place electrically by control of the address electrode and mirror bias voltages. While the mirror is in that position, effectively displaying (or not displaying) the data bit, new data is loaded onto its activation circuitry. Since it is advantageous to drive the address electrode using standard logic voltage levels, a mirror bias voltage is applied to the mirror metal layer to increase the voltage difference between the address electrodes and the mirrors. When the time interval for the currently displayed data ends, the mirror is reset with a reset signal, which allows it to release from its current position and assume the proper position for the next bit of data, already loaded.

DMD Border Pixels

Figure 3:
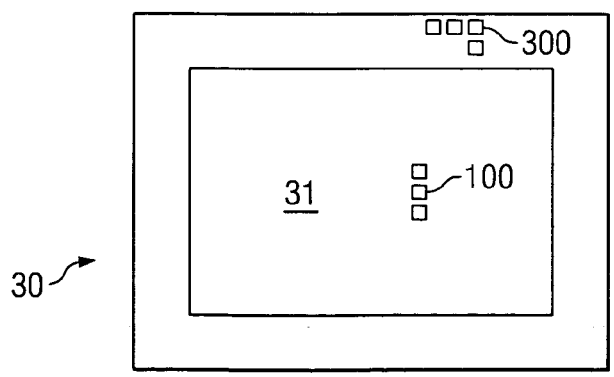
FIG. 3 is a top plan view of a DMD pixel array, showing both the active pixels and border pixels.

FIG. 3 illustrates a top plan view of the entire pixel array 30 of a DMD device. The active array 31 comprises pixels such as pixel 100, and is bordered by border pixels 300. The array 31 and arrangement of border pixels 300 is for illustration only—in other embodiments, the border may have some other regular or irregular shape. Also, the pixel layout need not be "brick-like" and the pixel shapes could be other than square. For example, the pixel surface could be hexagonal or some other polygon shape.

As stated above, for typical imaging applications, the border pixels 300 are desired to be "always off" (dark) In the example of this description, the off (state) is associated with a negative address electrode, to which the positively biased mirror is attracted.

Due to manufacturing problems, however, it is possible that a border pixel 300 may be torqued towards, or adhere to, an "on" tilt position. To overcome this problem, as explained below, border pixels 300 have a special configuration and mode of operation to ensure that they tilt to, and remain in, the off state.

Figure 4:
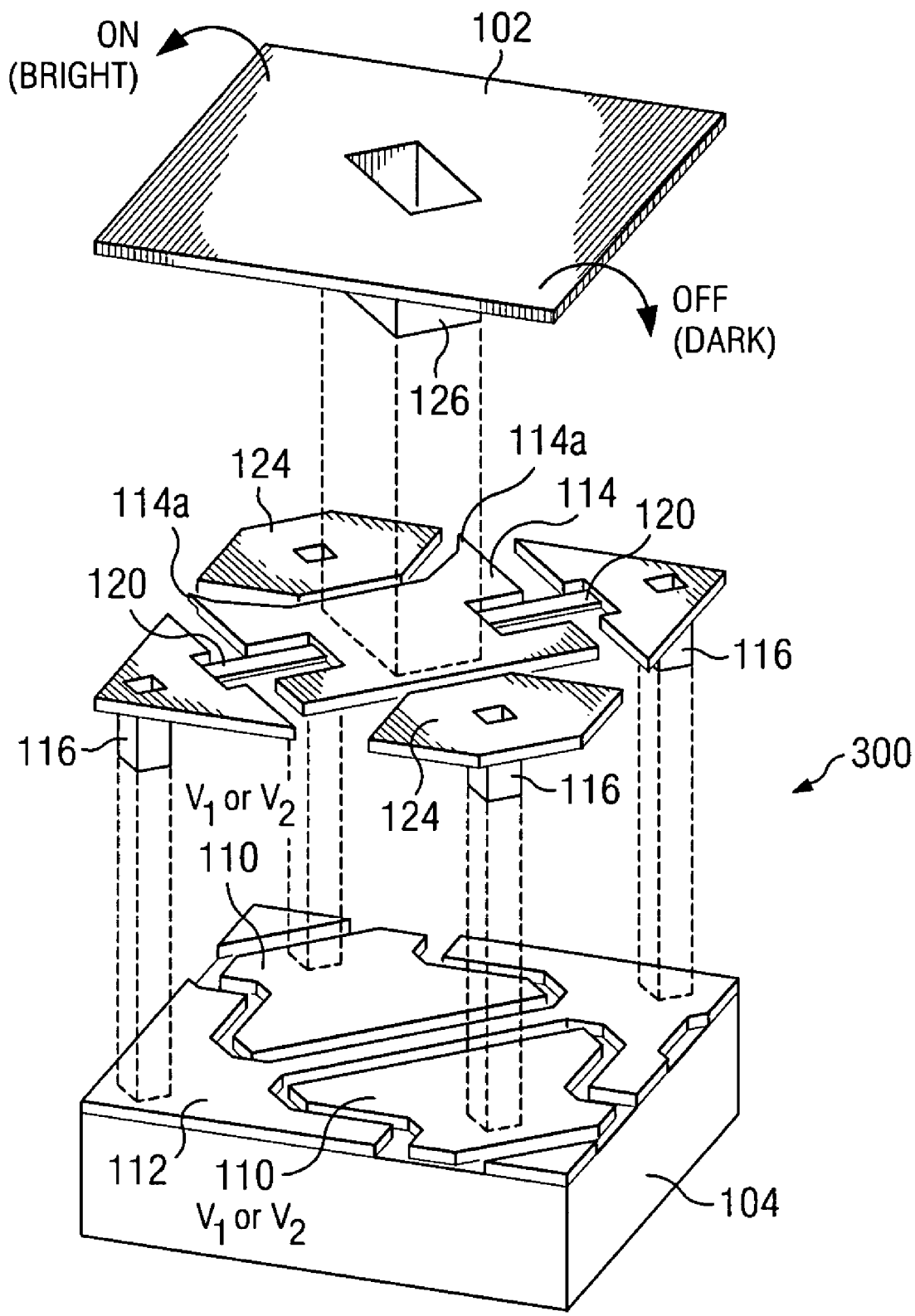
FIG. 4 is an exploded view of the pixel of FIG. 2, modified for use as a border pixel having spring tips on only side of its two tilt positions.

FIG. 4 is an exploded view of a border pixel 300 in accordance with the invention. The electrodes 110 of border pixel 300 are powered with variable voltages. This "active" configuration is in contrast to the conventional hardwiring of border pixel electrodes.

As illustrated, the two electrodes 110 of border pixel 300 may be switched between voltages $V_1$ and $V_2$. In the example of this description, Voltage $V_1$ represents ground (GRD), and voltage $V_2$ represents a supply voltage (Vcc) of approximately 7–8 volts or Vcc2 (explained below).

Border pixel 300 has spring tips 114a fabricated only on its positive tilt direction. As explained below, spring tips 114a provide a desired "kick" toward the "off" position in response to the reset signal.

Figure 5:
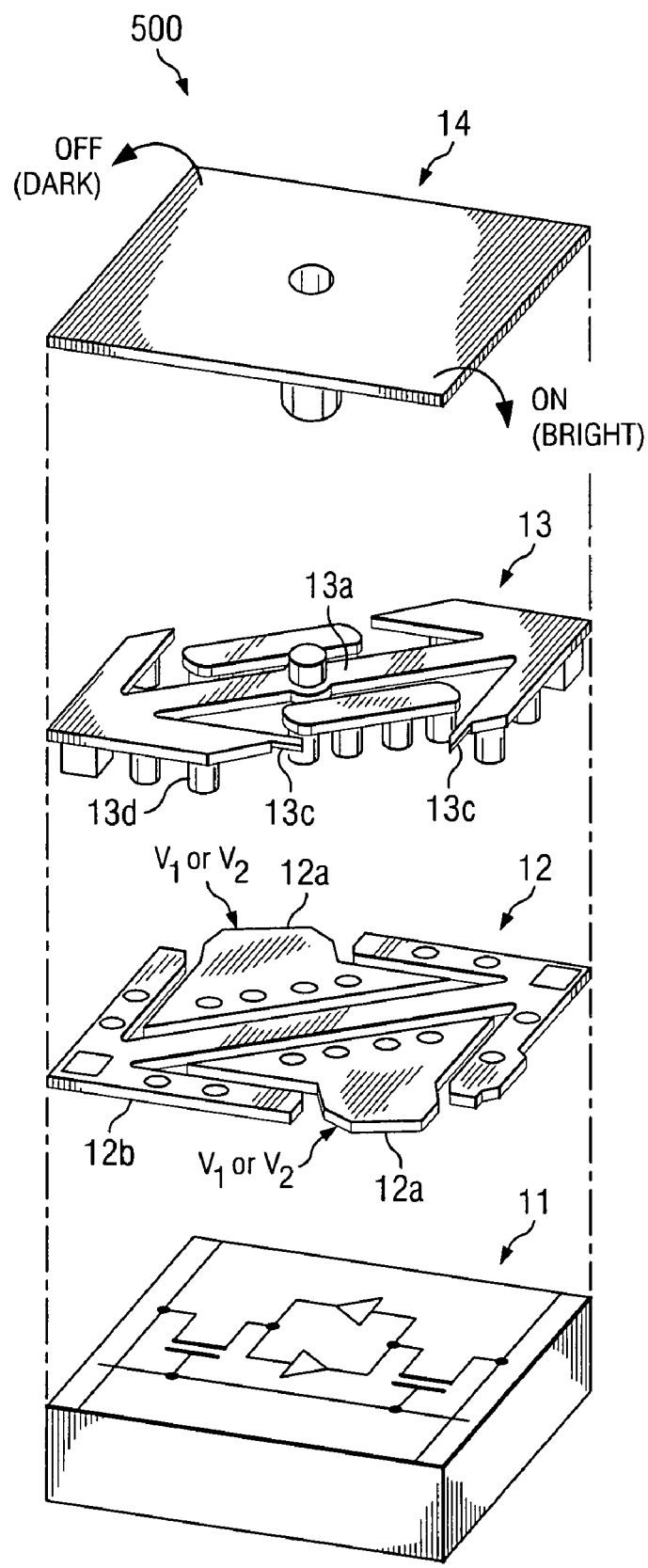
FIG. 5 is a "yokeless" embodiment of a border pixel.

FIG. 5 is an exploded view of a "yokeless" border pixel 500. Pixel has a mirror layer 14, a hinge layer 13 (with a hinge 13a and spring tips 13c), and an address layer (with address electrodes 12a and a bias/reset bus 12b). Like pixel 300, pixel 500 has variable voltages at its address electrodes 12a, and spring tips 13c on the positive tilt direction.

For the "yokeless" type pixel design of FIG. 5, the length of the spring tip 13c may be modified according to the location of the nearest hinge post 13d, particularly if the spring tip 13c is designed to have comparable cross section to the bias/reset bus 12b. The reset waveform may be optimized for a particular spring tip length and cross section.

In the embodiments of FIGS. 4 and 5, border pixels 300 and 500 have spring tips on only one side. The same concepts could be applied to a border pixel with spring tips on both sides, but the "off" side spring tips are not significant to the invention described herein. If the "off" side has spring tips, they may be "normal" spring tips, which will accomplish same side transitions, or they may be detuned to make same side transitions less energetic.

In other embodiments, equivalent structures to spring tips 114a (FIG. 4) or spring tips 13c (FIG. 5) may be used. In general, any structure designed for providing some degree of spring force to cause the mirror to be launched toward the opposing direction may be referred to as a "spring tip".

The invention is further applicable to any DMD type pixel design in addition to those specifically illustrated, and various designs may be modified to meet performance demands. For example, it may be desired to ensure uniform tilt angles between the active array and the border pixels and to modify the geometry of the spring tip layer of the border pixels accordingly.

Border Pixel Operation

FIG. 6 illustrates possible initial states of border pixels 300 and the operation steps that result in their being tilted to the desired "off" position. As illustrated, mirrors 102 may be stuck in or torqued towards an "on" (+) or "off" (−) direction or flat. For purposes of this description, "flat" border pixels are those that are not stuck or torqued, such that their response to addressing and reset signals is substantially normal.

As stated above, it is undesirable to have border pixels that are stuck or torqued in the "on" direction. The following method is performed to correct these pixels, typically at the factory to provide a DMD free of defective border pixels.

FIG. 7 illustrates an example of placing a flat border pixel in the off tilt position. The border pixel is landed to the "on" (+) side, with GRD applied to its "on" side electrode 110, Vcc applied to its "off" side electrode 110, and a positive mirror bias signal. The electrode voltages are then switched, such that GRD is applied to the "off" side electrode 110 and Vcc is applied to the "on" side electrode 110. After application of a reset signal, mirror 102 tilts to the "off" side.

FIG. 8 illustrates the reset sequence applied to a mirror 102 during reset. The mirror voltage is a positive voltage, Vbias, except during reset. Vreset is a large negative voltage. During reset, the address electrode that is at Vcc is switched to Vcc2. Voffset is typically the same as Vcc2. Examples of suitable voltages are 7 volts for Vcc2, 20 to 30 volts for Vbias, −20 to −30 volts for Vreset, and 6 to 8 volts for Voffset.

The transition of mirror 102 to the "off" side is a "cross over" transition. Before the reset signal, the "on" side electrode has Vcc. During the reset signal, the spring tip(s) are compressed due to the voltage differential between the mirror (Vreset) and the electrode (Vcc2). When the mirror voltage is switched to Voffset, the spring tip(s) kick the mirror off with maximum energy so as to send the mirror to the opposite side.

Any subsequent reset signals will result in a "same side transition", that is, the mirror will tilt to the "off" side. In a same side transition, before a reset signal is applied, the electrode that a mirror lands on has GRD. On the reset signal, the spring tips of the mirror are compressed due to the voltage differential between the mirror (Vreset) and the electrode (GRD). When the mirror voltage is switched to Voffset, the spring tip(s) tend to kick the mirror off but do not have sufficient energy to send the mirror to the opposite position. When the mirror voltage resumes Vbias, the voltage difference between Vbias and GRD pulls the mirror back down to the original position.

Even mirrors that are stuck or torqued on the "on" position can be placed on the "off" position. Such mirrors remain in the "on" position even when Vcc is applied to the "on" electrode. However, upon application of a reset signal, the mirror 102 experiences a maximum electrostatic attraction when Vreset is applied to the mirror. Maximum energy is stored as the spring tips 13b are compressed to the on direction. When the mirror voltage changes to Voffset, there is no longer an electrostatic attraction between the mirror and the electrode it is landed on. The spring tip(s) kick the mirror up, such that the mirror flies up and lands on the other side.

A global application of the method would be to perform the three steps of FIG. 7, so that appropriate voltages are applied to land all mirrors to the "on" state. Referring again to FIG. 6, pixels that are stuck or torqued "off" may not actually land in the "on" position, during the "land +" step.

However, if desired, the method can be applied selectively, to only stuck or torqued "on" pixels. Or, the method could be performed for those pixels as well as to "flat" pixels.

To implement the above-described electrode switching, the border pixels may be supplied with either internal switching circuit(s) or with external switchable power supplies. For the above-described "global" implementations of the method, the voltage switching circuitry may be globally implemented. The circuitry may be operable independently of the circuitry of the active pixel array, so that the border pixels can be positioned "off" at the factory and remain in that position regardless of operation of the active pixel array.

In an alternative embodiment of the invention, it may be possible to achieve proper "off" landing without switching electrode voltages. For this method, the "off" electrode is at GRD and the "on" electrode is at Vcc. With these voltages applied to the electrodes, application of a reset signal will result in all mirrors being set to the "off" position. "Good" mirrors will do a same side transition, whereas "bad" mirrors will do a cross-over transition. Regardless of whether or not electrode switching is performed, a common feature of all methods of the invention is that the border pixels are active rather than hardwired.

Alterations or permutations such as modifications, additions, or omissions may be made to the method without departing from the scope of the invention. The method may include more, fewer, or other steps. Additionally, steps may be performed in any suitable order without departing from the scope of the invention.

While this disclosure has been described in terms of certain embodiments and generally associated methods, alterations and permutations of the embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

To aid the Patent Office and any readers of any patent issued on this application in interpreting the claims appended hereto, applicants wish to note that they do not intend any of the appended claims to invoke paragraph 6 of 35 U.S.C. § 112 as it exists on the date of filing hereof unless the words "means for" or "step for" are used in the particular claim.

What is claimed is:

1. A method for setting mirrors of border pixels of a digital micromirror device to a desired "on" or "off" position, comprising the steps of:
    applying appropriate voltages at the address electrodes and mirror of each pixel, such that the pixels are electrostatically set to tilt toward a first position;
    switching the electrode voltages; and
    applying a reset signal to the pixels, such that they are positioned to the second position.

2. The method of claim 1, wherein the first position is the "on" position and the second position is the "off" position.

3. The method of claim 1, wherein the method is applied to pixels that are stuck in the first position.

4. The method of claim 1, wherein the method is applied to pixels that are torqued in the first position.

5. The method of claim 1, wherein the method is applied to pixels that are substantially flat.

6. The method of claim 1, wherein the pixels have one or more spring tips.

7. The method of claim 6, wherein the pixels have one or more spring tips associated with only the first position.

8. The method of claim 1, wherein the switching step results in a voltage difference between the address electrodes and a positive mirror voltage, and wherein the reset signal applied a negative voltage to the mirror.

9. The method of claim 8, wherein the reset signal provides a reset voltage to the mirror that is substantially more negative than the mirror voltage and positive electrode voltage.

10. The method of claim 8, wherein the reset signal provides a reset voltage to the mirror that is substantially more negative than the mirror voltage and the positive electrode voltage, followed by an offset voltage that is substantially the same as the positive electrode voltage during the reset.

11. A method for setting the mirror of a border pixel of a digital micromirror device to an "off" position, comprising the steps of:
   applying appropriate voltages at the address electrodes and mirror of the pixel, such that the pixel is electrostatically set to tilt toward the "on" position;
   switching the electrode voltages, such that the pixel is electrostatically set to tilt toward the "off" position; and
   applying a reset signal to the pixel, such that the pixel becomes positioned to the "off" position.

12. The method of claim 11, wherein the method is applied to a pixel that is stuck in the "on" position.

13. The method of claim 11, wherein the method is applied to a pixel that is torqued in the "on" position.

14. The method of claim 11, wherein the method is applied to a pixel that is substantially flat.

15. The method of claim 11, wherein the pixel has one or more spring tips.

16. The method of claim 15, wherein the one or more spring tips are associated with only the "on" position.

17. The method of claim 11, wherein the switching step results in a voltage difference between the address electrodes and a positive mirror voltage, and wherein the reset signal applied a negative voltage to the mirror.

18. The method of claim 17, wherein the reset signal provides a reset voltage to the mirror that is substantially more negative than the mirror voltage and positive electrode voltage.

19. An array of micromirror pixels, comprising:
   an inner array of active pixels, each comprising a tiltable mirror suspended over a pair of opposing address electrodes, such that the mirror is operable to tilt to an on or off position due to electrostatic forces between voltages applied to the address electrodes and to the mirror and in response to a reset signal;
   an outer perimeter of border pixels, each comprising a tiltable mirror suspended over a pair of opposing address electrodes, such that the mirror is operable to tilt to an on or off position due to electrostatic forces between voltages applied to the address electrodes and to the mirror and in response to a reset signal applied to the mirror; and
   wherein the electrodes of the border pixels are operable to be set to an "on" position, then switched, and wherein the mirror is operable to receive at least one reset signal.

20. The array of claim 19, wherein the border pixels are operable to have address electrode and mirror voltages applied globally.

21. An array of micromirror pixels, comprising:
   an inner array of active pixels, each comprising a tiltable mirror suspended over a pair of opposing address electrodes, such that the mirror is operable to tilt to an on or off position due to electrostatic forces between voltages applied to the address electrodes and to the mirror and in response to a reset signal;
   an outer perimeter of border pixels, each comprising a tiltable mirror suspended over a pair of opposing address electrodes, such that the mirror is operable to tilt to an on or off position due to electrostatic forces between voltages applied to the address electrodes and to the mirror and in response to a reset signal applied to the mirror; and
   wherein each border pixel has one or more spring tips at a landing area of its mirror.

22. The array of claim 21, wherein each border pixel has spring tips only under the on position of the mirror.

23. The array of claim 21, wherein each border pixel has spring tips that are asymmetrical from the on position to the off position.

24. A method for setting mirrors of border pixels of a digital micromirror device to a desired "on" or "off" position, comprising the steps of:
   applying appropriate voltages at the address electrodes and mirror of each pixel, such that the pixels are electrostatically set to tilt toward the desired position; and
   applying a reset signal to the pixels, such that they are positioned to the desired position.

* * * * *